United States Patent
Hodsdon et al.

(10) Patent No.: US 9,401,034 B2
(45) Date of Patent: Jul. 26, 2016

(54) TESSELLATION OF TWO-DIMENSIONAL CURVES USING A GRAPHICS PIPELINE

(71) Applicant: MICROSOFT CORPORATION, Redmond, WA (US)

(72) Inventors: Anthony John Rolls Hodsdon, Seattle, WA (US); Blake Douglas Pelton, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 253 days.

(21) Appl. No.: 13/873,403

(22) Filed: Apr. 30, 2013

(65) Prior Publication Data

US 2014/0320523 A1 Oct. 30, 2014

(51) Int. Cl.
*G06T 5/00* (2006.01)
*G06T 11/20* (2006.01)
*G06T 17/20* (2006.01)

(52) U.S. Cl.
CPC ............. *G06T 11/203* (2013.01); *G06T 17/20* (2013.01); *G06T 2200/28* (2013.01)

(58) Field of Classification Search
CPC ..... G06T 11/203; G06T 15/005; G06T 17/20; G06T 11/40; G06T 17/30; G06T 15/04; G06T 2200/28; G06T 11/60; G06T 1/20; G06T 11/001; G06T 15/30; G06T 17/10; G06T 11/20; G06T 13/80; G06T 15/20; G06T 15/80; G06T 17/205; G06T 19/20; G06T 2200/12; G06T 2207/20182; G06T 2219/2021; G06T 5/002; G06T 7/0028; G06T 9/00; G06T 9/20; G06T 11/206; G06T 13/20; G06T 15/00; G06T 15/10; G06T 15/40; G06T 17/00; G06T 19/00; G06T 1/00; G06T 2200/08; G06T 3/00; G06T 3/0093; G06T 7/00

See application file for complete search history.

(56) References Cited

U.S. PATENT DOCUMENTS

| | | | |
|---|---|---|---|
| 4,918,626 | A | 4/1990 | Watkins et al. |
| 5,287,438 | A | 2/1994 | Kelleher et al. |

(Continued)

FOREIGN PATENT DOCUMENTS

CN 101065784 10/2007

OTHER PUBLICATIONS

"International Search Report & Written Opinion for PCT Patent Application No. PCT/US2013/061069", Mailed Date: Nov. 21, 2013, Filed Date: Sep. 21, 2013, 13 Pages.

(Continued)

*Primary Examiner* — Sultana M Zalalee
(74) *Attorney, Agent, or Firm* — Sunah Lee; Judy Yee; Micky Minhas

(57) ABSTRACT

Methods, systems, and computer-storage media for efficiently tessellating two dimensional (2-D) curves using a graphics pipeline running on a graphics processing unit (GPU) are provided. A central processing unit (CPU) converts a geometry having one or more 2-D curves into an intermediate tessellation having at least one Bezier fan with a fan origin and four control points. The intermediate tessellation is sent on to the graphics pipeline. A hull shader in the graphics pipeline is configured to approximate the Bezier fan curve by subdividing the curve into a defined number of triangles based on a maximum value of a width or a height of a bounding box containing the four control points of the Bezier fan. A domain shader in the graphics pipeline is configured to determine a vertex position for each of the defined triangles along the curve of the Bezier fan.

20 Claims, 8 Drawing Sheets

(56) References Cited

U.S. PATENT DOCUMENTS

| | | | |
|---|---|---|---|
| 6,005,582 | A | 12/1999 | Gabriel et al. |
| 6,317,525 | B1 | 11/2001 | Aleksic et al. |
| 6,501,483 | B1 | 12/2002 | Wong et al. |
| 6,683,617 | B1 | 1/2004 | Naoi et al. |
| 6,967,663 | B1 | 11/2005 | Bastos et al. |
| 7,006,101 | B1 | 2/2006 | Brown et al. |
| 7,375,727 | B1 | 5/2008 | Greene et al. |
| 7,408,553 | B1 | 8/2008 | Toksvig et al. |
| 7,924,278 | B2 | 4/2011 | Loop et al. |
| 7,928,979 | B2 | 4/2011 | Patel et al. |
| 8,044,955 | B1 | 10/2011 | Yhann |
| 8,115,773 | B2 | 2/2012 | Swift et al. |
| 2002/0130886 | A1 | 9/2002 | Baldwin |
| 2003/0016217 | A1* | 1/2003 | Vlachos et al. ............... 345/423 |
| 2003/0214506 | A1 | 11/2003 | Koselj et al. |
| 2004/0001069 | A1 | 1/2004 | Snyder et al. |
| 2005/0041039 | A1 | 2/2005 | Koselj |
| 2005/0212806 | A1 | 9/2005 | Koselj et al. |
| 2006/0250407 | A1 | 11/2006 | Xu |
| 2007/0018988 | A1 | 1/2007 | Guthe |
| 2007/0071312 | A1 | 3/2007 | Gardella et al. |
| 2008/0012878 | A1 | 1/2008 | Nystad |
| 2008/0118148 | A1 | 5/2008 | Jiao et al. |
| 2008/0284780 | A1 | 11/2008 | Hsu |
| 2009/0141038 | A1* | 6/2009 | Newaskar et al. ............ 345/589 |
| 2009/0153570 | A1 | 6/2009 | Jiao et al. |
| 2009/0237401 | A1 | 9/2009 | Wei et al. |
| 2009/0256848 | A1 | 10/2009 | Iourcha et al. |
| 2009/0303245 | A1 | 12/2009 | Soupikov et al. |
| 2010/0002000 | A1 | 1/2010 | Everitt et al. |
| 2010/0110102 | A1 | 5/2010 | Nystad et al. |
| 2010/0141659 | A1 | 6/2010 | Bourd et al. |
| 2010/0164955 | A1* | 7/2010 | Sathe et al. .................. 345/423 |
| 2010/0164983 | A1 | 7/2010 | Lawrence et al. |
| 2010/0283793 | A1 | 11/2010 | Cameron et al. |
| 2011/0063294 | A1 | 3/2011 | Brown et al. |
| 2011/0090228 | A1 | 4/2011 | Persson |
| 2011/0249011 | A1 | 10/2011 | Lalonde et al. |
| 2011/0285736 | A1 | 11/2011 | Kilgard |
| 2011/0285742 | A1 | 11/2011 | Kilgard et al. |
| 2011/0285747 | A1 | 11/2011 | Kilgard |
| 2011/0310102 | A1* | 12/2011 | Chang .......................... 345/423 |
| 2012/0086715 | A1 | 4/2012 | Patel et al. |

OTHER PUBLICATIONS

Segal et al., "Chapter 11: Programmable Vertex Processing", In the OpenGL Graphics System: A Specification (Version 4.3 (Core Profile)), Aug. 6, 2012, 50 Pages.

Ni, et al., "Efficient Substitutes for Subdivision Surfaces", In ACM SIGGRAPH Courses, Aug. 5, 2009, 107 Pages.

"GPU Experiments: Tessellation Example", Published on: Feb. 19, 2010, Available at: http://gpuexperiments.blogspot.in/2010/02/tessellation-example.html.

NFOA mailed Sep. 7, 2012 in U.S. Appl. No. 12/899,125, filed Oct. 6, 2010, 21 pages.

Final Office Action mailed Feb. 13, 2013 in U.S. Appl. No. 12/899,125; 33 pages.

Non Final Office Action in U.S. Appl. No. 12/899,125, mailed Oct. 16, 2013, 33 pages.

Huang, et al., "Feature Adaptive Rendering of Loop Subdivision Surfaces on GPU", In the Technical Report, State Key Lab of CAD &CG, Zhejiang University, Mar. 25, 2013, 20 pages.

Bunnell, Michael," Adaptive Tessellation of Subdivision Surfaces with Displacement Mapping", In Book—GPU Gems 2, Mar. 13, 2005, 15 pages.

Hollander, et al., "Synthesizing Subdivision Meshes using Real Time Tessellation", In 18th Pacific Conference on Computer Graphics and Applications, Sep. 25, 2010, 7 pages.

Rossignac, et al., "Ringing Subdivision of Curves and Surfaces", In Georgia Tech Report, Oct. 2008, 11 pages.

Loop, et al., "Rendering Vector Art on the GPU", In Book—GPU Gems 3, Aug. 12, 2007, 18 pages.

Final Office Action mailed May 20, 2014 in U.S. Appl. No. 12/899,125, 20 pages.

Chinese Office Action dated Sep. 22, 2014 with Search Report dated Sep. 15, 2014 in Application No. 201110297144.4, 18 pages.

Non-Final Office Action dated Nov. 4, 2014 in U.S. Appl. No. 12/899,125, 16 pages.

Final Office Action dated Apr. 2, 2015 in U.S. Appl. No. 12/899,125, 12 pages.

"Third Office Action Issued in Chinese Patent Application No. 201110297144.4", Mailed Date: Mar. 30, 2015, 16 Pages.

Notice of Allowance dated Jul. 16, 2015 in U.S. Appl. No. 12/899,125, 12 pages.

* cited by examiner

TESSELLATION OF TWO-DIMENSIONAL CURVES USING A GRAPHICS PIPELINE

BACKGROUND

One of the primary tasks of a two-dimensional (2-D) graphics library is to take scene data, tessellate it into high-level primitives such as arcs, Bezier curves, and line segments, and rasterize the data for output on a computer display or for storage in a bitmap file format. For speed, the graphics library can offload some stages of the rendering onto a graphics processing unit (GPU). Geometries such as arcs and Bezier curves have typically posed particular challenges to offloading as the GPU normally cannot consume such geometries or can only consume these types of geometries at a high per-pixel cost. Thus, prior to offloading, the central processing unit (CPU) must first translate the arcs and Bezier curves into low-level primitives such as triangles that the GPU can process. This consumes valuable CPU processing power and often causes a bottleneck in the rendering process.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to systems, methods, and computer-storage media for, among other things, efficiently tessellating 2-D curves using a graphics pipeline running on a GPU. A CPU converts scene data and/or objects having one or more 2-D curves into an intermediate tessellation having at least one Bezier fan. The intermediate tessellation is sent on to the graphics pipeline. A hull shader in the graphics pipeline is configured to approximate the Bezier fan curve by subdividing the curve into a defined number of triangles based on a maximum value of a width or a height of a bounding box containing control points of the Bezier fan. A domain shader in the graphics pipeline is configured to determine a vertex position for each of the defined triangles along the curve of the Bezier fan.

Embodiments of the present invention can be used in combination with target independent rasterization (TIR). TIR enables the number of pixel samples taken during the rasterization stage in the graphics pipeline (known as the "sampling rate") to be specified independently from the memory allocated for the rendered image.

BRIEF DESCRIPTION OF THE DRAWINGS

The present invention is described in detail below with reference to the attached drawing figures, wherein.

DETAILED DESCRIPTION

Figure 1:
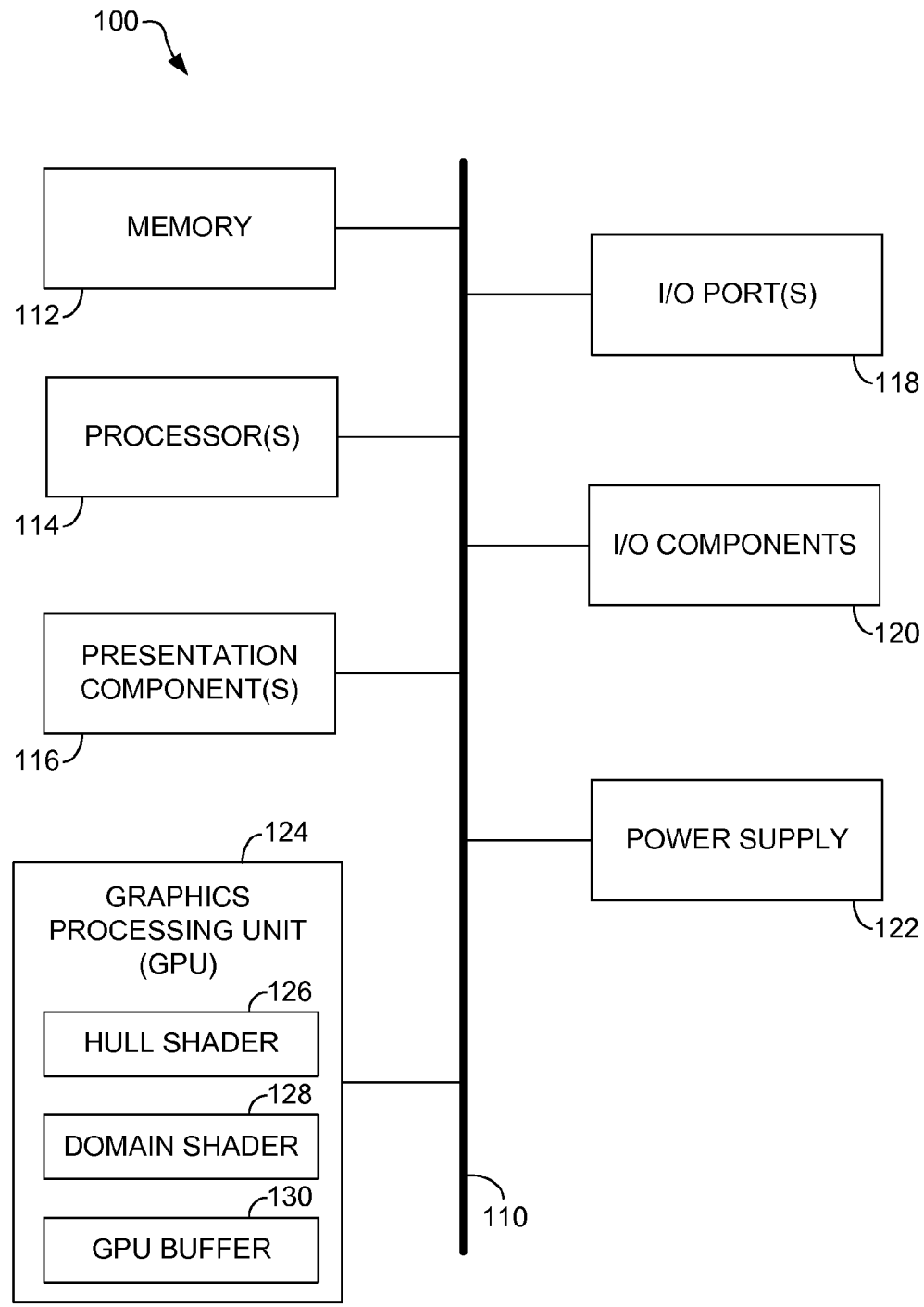
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein are generally directed to systems, methods, and computer-storage media for, among other things, efficiently tessellating 2-D curves using a graphics pipeline running on a GPU. A CPU converts scene data objects having one or more 2-D curves into an intermediate tessellation having at least one Bezier fan with a fan origin and four control points. The intermediate tessellation is sent on to the graphics pipeline. A hull shader in the graphics pipeline is configured to approximate the Bezier fan curve by subdividing the curve into a defined number of triangles based on a maximum value of a width or a height of a bounding box containing the four control points of the Bezier fan. A domain shader in the graphics pipeline is configured to determine a vertex position for each of the defined triangles along the curve of the Bezier fan.

Embodiments of the present invention can be used in combination with target independent rasterization (TIR). TIR enables the number of pixel samples taken during the rasterization stage in the graphics pipeline (known as the "sampling rate") to be specified independently from the memory allocated for the rendered image.

Accordingly, in one embodiment, the present invention is directed to one or more computer-storage media having computer-executable instructions embodied thereon that, when executed, perform a method of rendering antialiased 2-D curves. The method comprises converting scene data into an intermediate tessellation comprising a set of geometric shapes tessellated from objects in the scene data. The set of geometric shapes comprises at least one Bezier fan having four control points and a fan origin. A first instruction is generated to configure a hull shader in a graphics pipeline to, among other things, approximate a curve of the at least one Bezier fan by subdividing the curve into a defined number of triangles based on a maximum value of a width or a height of a minimum bounding box containing the four control points of the at least one Bezier fan. A second instruction is generated to configure a domain shader in the graphics pipeline to determine a vertex position for each of the defined number of triangles along the curve of the at least one Bezier fan. The intermediate tessellation is communicated to the graphics pipeline.

In another embodiment, the present invention is directed to a method of rasterizing an intermediate tessellation of an object in a graphics pipeline running on a GPU where the intermediate tessellation comprises at least one Bezier fan having four control points and a fan origin. The method comprises receiving the intermediate tessellation from a CPU of a computing device and receiving a first instruction to configure a hull shader in the graphics pipeline to, among other things, approximate a curve of the at least one Bezier fan by subdividing the curve into a defined number of triangles. The hull shader, through the computing device, is configured based on the first instruction. A second instruction is received for configuring a domain shader in the graphics pipeline to determine a vertex position for each of the defined number of triangles along the curve of the at least one Bezier fan. The domain shader, through the computing device, is configured based on the second instruction.

In yet another embodiment, the present invention is directed to a computer-storage medium storing an application program interface (API) for controlling a GPU. The API comprises a subdivision-factor property that defines parameters used by a hull shader component to, among other things, approximate a curve of at least one Bezier fan by subdividing the curve into a defined number of triangles based on a maximum value of a width or a height of a minimum bounding box containing four control points that define the Bezier fan. The API also comprises a position-factor property that defines parameters used by a domain shader component to determine a vertex position for each of the defined number of triangles along the curve of the at least one Bezier fan.

Having briefly described an overview of embodiments of the invention, an exemplary operating environment suitable for use in implementing embodiments of the invention is described. Referring to the drawings in general, and initially to FIG. 1 in particular, an exemplary operating environment for implementing embodiments of the invention is shown and designated generally as a computing device 100. The computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implements particular abstract data types. Embodiments of the invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, an illustrative power supply 122, and a GPU 124. The bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component 120. Also, CPUs and GPUs have memory. The diagram of FIG. 1 is merely illustrative of an exemplary computing device that can be used in connection with one or more embodiments of the invention. Distinction is not made between such categories as "workstation," "server," "laptop," "handheld device," etc., as all are contemplated within the scope of FIG. 1 and reference to "computer" or "computing device."

The computing device 100 typically includes a variety of computer-readable media. Computer-readable media may be any available media that is accessible by the computing device 100 and includes both volatile and nonvolatile media, removable and non-removable media. Computer-readable media comprises computer storage media and communication media; computer storage media excludes signals per se. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media, on the other hand, embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 112 includes computer-storage media in the form of volatile and/or nonvolatile memory. The memory 112 may be removable, non-removable, or a combination thereof. Exemplary memory includes solid-state memory, hard drives, optical-disc drives, etc. The computing device 100 includes one or more processors 114 that read data from various entities such as the bus 110, the memory 112 or the I/O components 120. The presentation component(s) 116 presents data indications to a user or other device. Exemplary presentation components 116 include a display device, speaker, printing component, vibrating component, etc. The I/O ports 118 allow the computing device 100 to be logically coupled to other devices including the I/O components 120, some of which may be built in. Illustrative I/O components 120 include a microphone, joystick, game pad, satellite dish, camera, microphone, scanner, printer, wireless device, etc. Interaction with the illustrative I/O components 120 may be via touch, voice, gesture, and the like.

Components of the computing device 100 may be used in image processing. For example, the computing device 100 may be used to implement a graphics pipeline, similar to graphics pipeline 300 of FIG. 3, which processes and applies various effects and adjustments to a raw image. The graphics pipeline includes a series of operations that are performed on a digital image. These pipelines are generally designed to allow efficient processing of a digital image, while taking advantage of available hardware.

To implement a graphics pipeline, one or more procedural shaders on the GPU 124 are utilized. Procedural shaders are specialized processing subunits of the GPU 124 for performing specialized operations on graphics data. An example of a procedural shader is a hull shader 126, which generally operates on 2-D curves such as, for example, Bezier fans. For instance, the hull shader 126 can apply computations related to subdividing the 2-D curve into a defined number of triangles based on dimensions associated with a minimum bounding box that encompasses control points that define the 2-D curve. Another example of a procedural shader is a domain shader 128. For instance, the output of the hull shader 126 is passed to the domain shader 128, which, in turn, applies computations to define a vertex position for each of the defined number of triangles along the 2-D curve. Other procedural shaders such as a vertex shader and a pixel shader are also utilized; these shaders will be explained in greater depth below with respect to FIG. 3. After a procedural shader concludes its operations, the information may be placed in a GPU buffer 130. The information may be presented on an attached display device or may be sent back to the host for further operations.

The GPU buffer 130 provides a storage location on the GPU 124 where processed scene data may be stored. As various processing operations are performed with respect to the scene data, the data may be accessed from the GPU buffer 130, altered, and then re-stored on the buffer 130. The GPU buffer 130 allows the data being processed to remain on the GPU 124 while it is transformed by a graphics pipeline. As it is time-consuming to transfer data from the GPU 124 to the memory 112, it may be preferable for the data to remain on the GPU buffer 130 until processing operations are completed.

With respect to the hull shader 126 and the domain shader 128, specialized functionality can be achieved by downloading instructions to the hull shader 126 and the domain shader 128. Furthermore, the functionality of many different operations may be provided by instruction sets tailored to other components such as a pixel shader and a rasterizer. For example, negating, remapping, biasing, and other functionality are useful for many graphics applications. The ability to program the hull shader 126 and the domain shader 128 on the GPU 124 to process 2-D curves is advantageous for graphics operations because of the processing speed achieved by utilizing the parallel architecture of the GPU 124. These specialized sets of instructions may add value by easing development and improving performance. By executing these instructions, a variety of functions can be performed by the hull shader 126 and the domain shader 128, assuming the instruction count limit and other hardware limitations of the shaders 126 and 128 are not exceeded. The hull shader 126, the domain shader 128, and other components may receive instructions through one or more application program interfaces (APIs).

Figure 2:
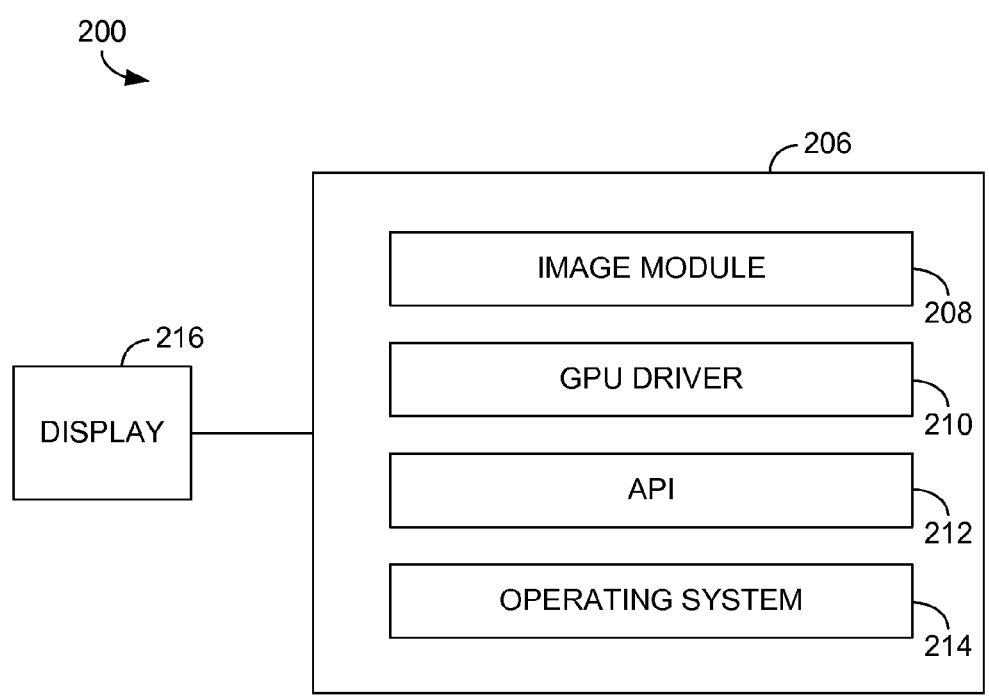
FIG. 2 is a block diagram of an exemplary computing system architecture for defining a tessellation methodology for two-dimensional curves suitable for use in implementing embodiments of the present invention.

With reference to FIG. 2, a block diagram is illustrated that shows an exemplary computing system architecture 200 suitable for use with embodiments of the present invention. The computing system architecture 200 shown in FIG. 2 is merely an example of one suitable computing system and does not limit the scope of use or functionality of the present invention. Neither should the computing system architecture 200 be interpreted as having any dependency or requirement related to any single module/component or combination of modules/components.

The computing system architecture 200 includes a computing device 206 and a display 216. The computing device 206 comprises an image module 208, a GPU driver 210, an API module 212 and an operating system 214. The computing device 206 may be any type of computing device, such as, for example, the computing device 100 described above with reference to FIG. 1. By way of example only and not limitation, the computing device 206 may be a personal computer, desktop computer, laptop computer, handheld device, mobile handset, consumer electronic device, or the like.

The image module 208 transmits data for an object or scene to be rendered. The image module 208 may be a computer program for which objects or scenes are to be rendered. The objects or scenes to be rendered may include, but are not limited to, video game images, video clips, movie images, and static screen images. The objects may be three dimensional or two dimensional. The API module 212 is an interface, which may be provided by the operating system 214, to support requests made by computer programs, such as the image module 208. Direct3D® and OpenGL® are examples of APIs that support requests of the image module 208. The device 206 is in communication with the display device 216.

The image module 208 may provide configuration instructions for one or more components in a graphics pipeline. The instructions may also be provided by the operating system 214. The instructions may be passed to the API module 212, which exposes functions of the GPU drivers 210 to the image module 208. The API module 212 may configure functions in the GPU drivers 210 based on the instructions received. As explained in more detail subsequently, the API module 212 has a subdivision-factor property that defines parameters used by a hull shader, such as the hull shader 126 of FIG. 1, to, among other things, approximate a 2-D curve by subdividing the curve into a defined number of triangles based on a maximum value of a width or height of a minimum bounding box containing control points that define the 2-D curve. The API module 212 may also have a position-factor property that defines parameters used by a domain shader, such as the domain shader 128 of FIG. 1, to position the 2-D curve by determining a vertex position for each of the defined number of triangles along the 2-D curve. Additionally, the API module 212 may have a render-target storage property that defines an amount of memory allocated on the GPU to a rendered image and a sampling-rate property that defines a sampling rate used by a rasterizer component. The image module 208 may provide instructions for these properties on a per frame basis or change these functions multiple times while rendering a single scene or object.

Figure 3:
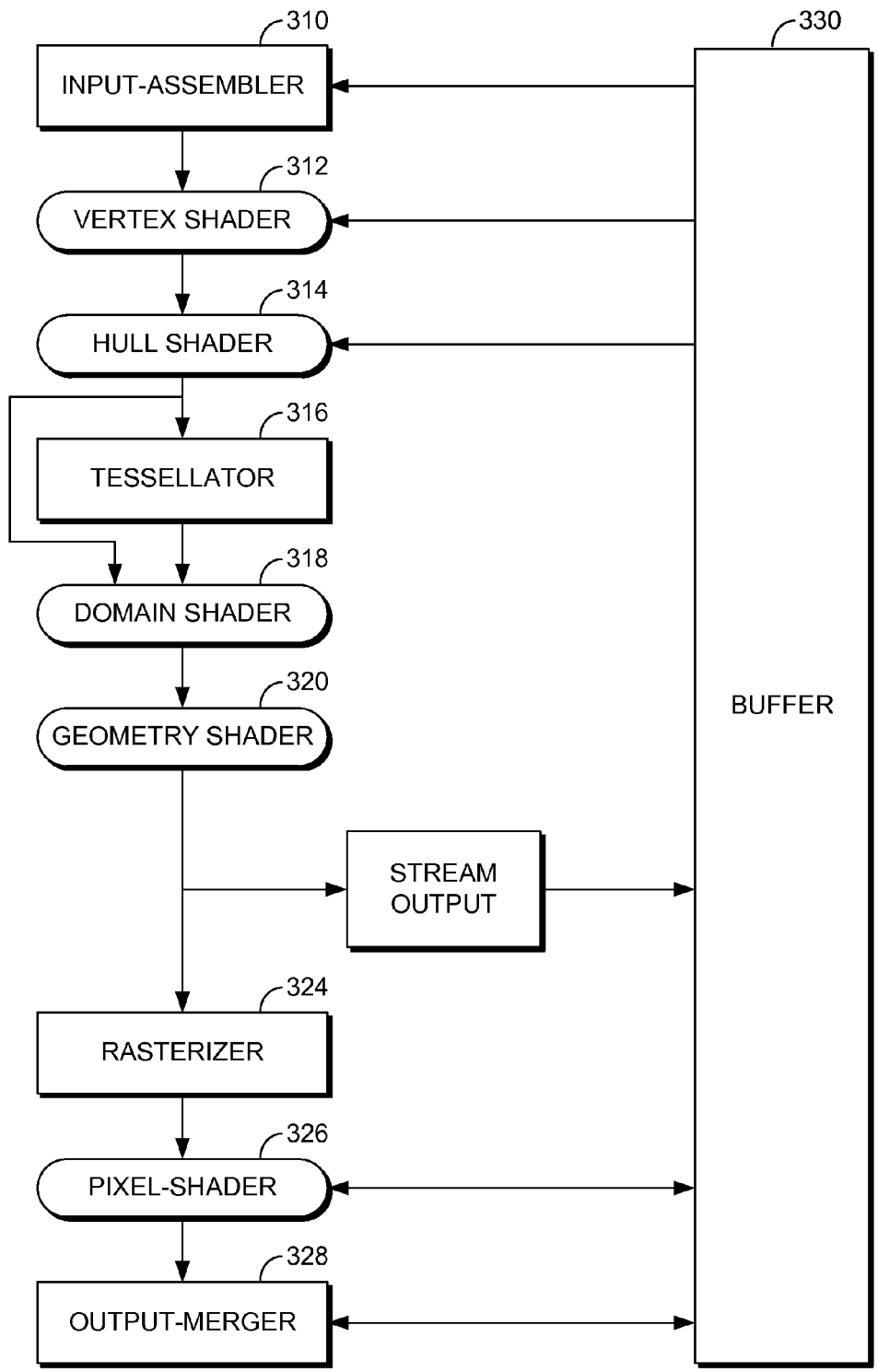
FIG. 3 is a diagram of a graphics pipeline for use in rasterizing an intermediate tessellation having one or more triangles and one or more Bezier fans suitable for use in implementing embodiments of the present invention.

With reference to FIG. 3, an exemplary graphics pipeline 300 is shown. The graphics pipeline 300 includes the stages for transforming scene data into rasterized bitmap-representations of the data (also known as a coverage mask or a rendered image) that may be displayed on a display device. The graphics pipeline 300 includes an input assembler 310, a vertex shader 312, a hull shader 314, a tessellator 316, a domain shader 318, a geometry shader 320, a rasterizer 324, a pixel shader 326, and output merger 328. The rendered image produced by the graphics pipeline 300 may be written to a GPU buffer 330 allocated for the rendered image (e.g., as shown by the arrows connecting the graphics pipeline 300 and the GPU buffer 330). The graphics pipeline 300 depicted in FIG. 3 is exemplary, and additional components may be added or components removed.

The input assembler 310 reads vertices out of memory (e.g., the GPU buffer 330), as well as control points and fan origins associated with Bezier fans, forms geometries from these data points (e.g., sets of triangles and Bezier fans), and creates pipeline work items. Each set of primitives (e.g., triangles versus Bezier fans) is handled as a separate pass on the graphics pipeline 300. For efficiency, however, like primitives from multiple geometries will be processed together in a single pass on the graphics pipeline 300.

Triangle primitives are rasterized using the vertex shader 312 and the pixel shader 326. The vertex shader 312 is a graphics processing function used to add special effects to objects in a 3-D environment by performing mathematical operations on the objects' vertex data. The geometry shader 320 generates new graphics primitives, such as points, lines, and triangles, from those primitives that were sent to the beginning of the graphics pipeline 300. The rasterizer 324 converts scene data into a raster image (e.g., pixels) for output to a display or file. The rasterizer 324 may sample the scene data at several sub-pixels per pixel. The pixel shader 326 serves to manipulate a pixel color, usually to apply an effect on an image, for example; realism, bump mapping, shadows, anti-aliasing, and explosion effects. It is a graphics function that calculates effects on a per-pixel basis. Output merger 328 performs blend, depth and stencil operations. The rendered image produced by the output merger 328 is written to the GPU buffer 330.

Bezier fan primitives are rasterized using the hull shader 314, the tessellator 316, and the domain shader 318 in addition to the other shaders and/or components outlined above. As will be described in more detail below, the hull shader 314 specifies, among other things, that a Bezier fan will be treated as a deformed triangle, partitions the interior of the deformed triangle into one or more triangles and a curve segment, and approximates the curve segment by specifying how the curve segment will be subdivided. For instance, the hull shader 314 specifies the number of triangles to be used to approximate the curve segment based on dimensions of a bounding box encompassing the Bezier fan's control points. The tessellator 316 carries out the tessellation of the Bezier fan based on the parameters specified by the hull shader 314.

The output of the tessellator 316 is passed on to the domain shader 318. The domain shader 318 also receives as input directly from the hull shader 314, at least the four control points and the fan origin associated with the Bezier fan. The domain shader 318 operates on these values using, for example, a Bernstein polynomial to output a vertex position of each of the triangles along the curve segment of the Bezier fan. Thus, at a high level, the hull shader 314 specifies parameters used to describe the overall shape of the geometry having the 2-D curve, and the domain shader 318 positions the geometry.

Figure 4:
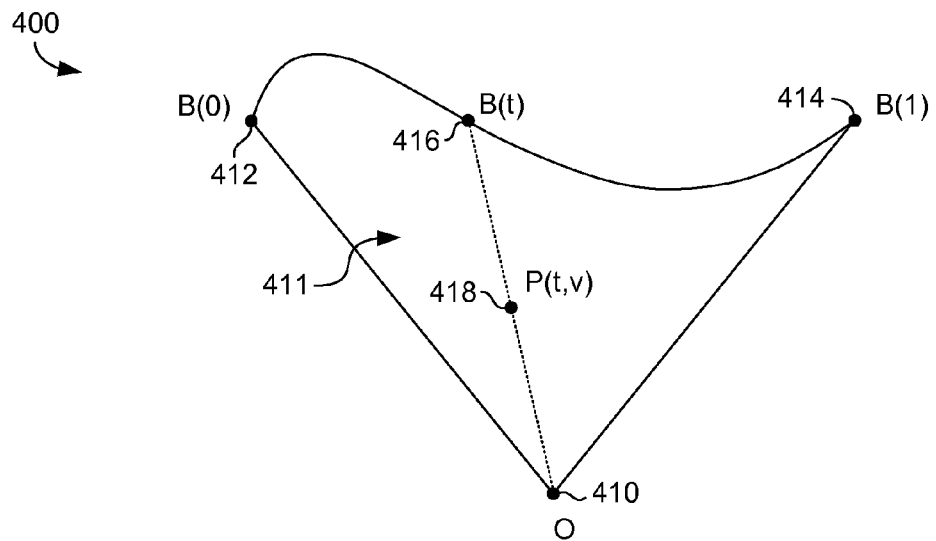
FIG. 4 is an illustration of a Bezier fan in accordance with an embodiment of the present invention.

Turning now to FIG. 4, an illustration of a Bezier fan is shown and is referenced generally by the numeral 400. The Bezier fan 400 is defined by a single vertex 410 known as the fan origin, O, and a cubic Bezier known as the fan contour 411. As shown in FIG. 4, the fan contour 411 covers all points $(t, v)=B(t)*v+O*(1-v); 0 \le t, v \le 1$, where $B(t)$ is a parameterization of the Bezier over the [0, 1] interval (e.g., between points 412 and 414), and O is the fan origin 410. As seen in FIG. 4, the variable, t, describes how far along the Bezier curve a first point is located (point 416), and the variable, v, describes the distance a second point (point 418) is along a line connecting the fan origin, O, with the first point 416.

Figure 5:
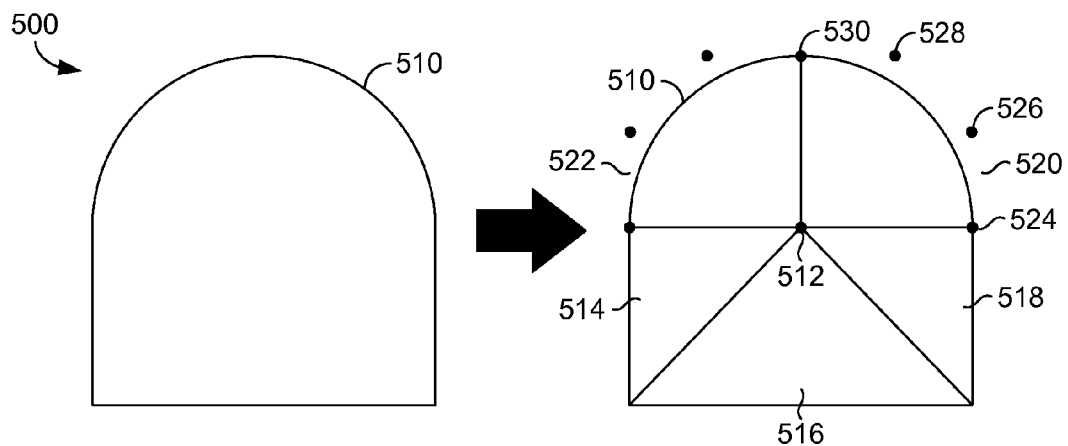
FIG. 5 is an illustration of an intermediate tessellation in accordance with an embodiment of the present invention.

The Bezier fan 400 shown in FIG. 4 is produced subsequent to a CPU taking an object and tessellating the object into an intermediate tessellation having high-level primitives such as the Bezier fan 400 and triangles. For instance, with respect to an object such as object 510 shown in FIG. 5, the CPU selects the center of a bounding box of the object 510 as the figure origin 512. Each segment of the object 510 is then "walked." When a line segment is encountered, a triangle with vertices defined by the line end points and the figure origin 512 is outputted. This is shown by triangles 514, 516, and 518 of FIG. 5. When a Bezier segment is encountered, a Bezier fan is outputted using the Bezier curve itself as the fan contour and the figure origin 512 as the fan origin. FIG. 5 depicts two Bezier fans 520 and 522. Bezier fans produced this way may be defined or encoded as a set of four control points and the fan origin. For instance, the Bezier fan 520 may be encoded using the figure origin 512 as the fan origin and control points 524, 526, 528 and 530.

Bezier fans resulting from the above process may be self-intersecting and primitives may overlap. This may be handled by the CPU further sub-dividing the Bezier fans to ensure that the fans do not self-intersect and primitives do not overlap. Alternatively, if any portion of the resulting coverage mask overlaps, the coverage mask may first be rendered into an intermediate bitmap with an XOR logical blend. Although the intermediate tessellation shown in FIG. 5 includes a cubic Bezier fan, embodiments of the invention can be extended to support additional segment types such as arcs and quadratic Beziers at the cost of additional passes through the graphics pipeline. In an alternative embodiment, objects having N segment types could be subdivided into N sets of primitives corresponding to triangles and N−1 sets of fan types, with the fan contours defined by a segment of the corresponding type.

Figure 6:
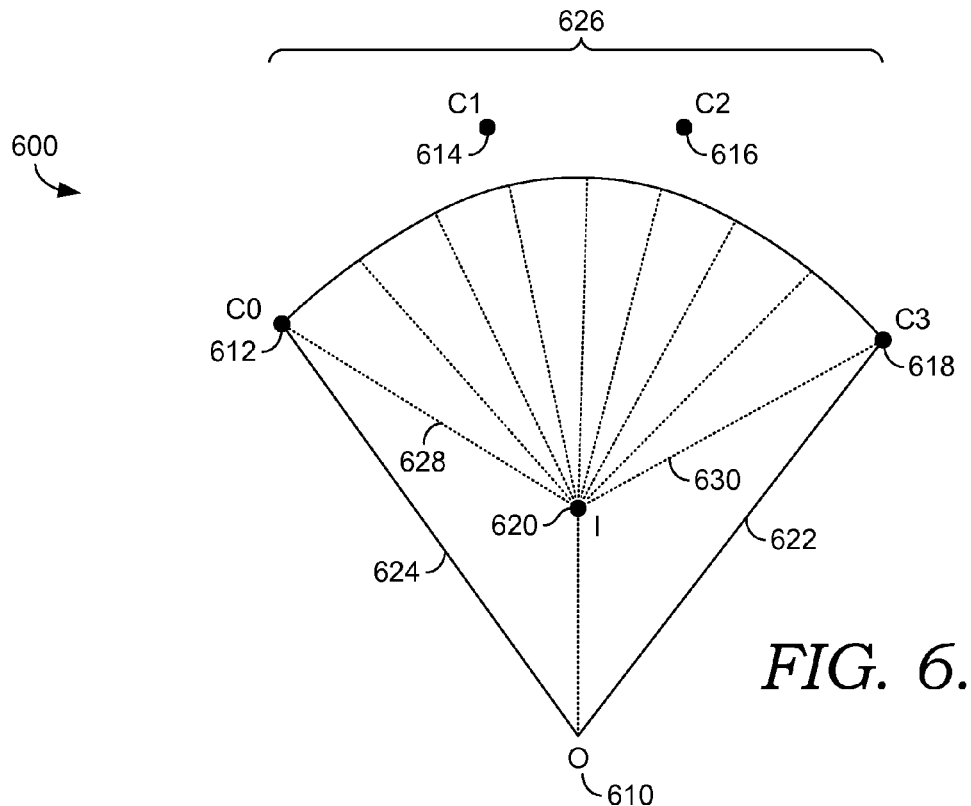
FIG. 6 is an illustration of an intermediate tessellation that has been tessellated in a graphics pipeline running on a graphics processing unit in accordance with an embodiment of the present invention.

Turning now to FIG. 6, FIG. 6 depicts a Bezier fan 600 after being operated on by a hull shader, such as the hull shader 314 of FIG. 3. As explained above with respect to FIG. 5, the hull shader receives as input a fan origin 610 and four control points 612, 614, 616, and 618 that define the Bezier fan 600. The hull shader utilizes a set of parameters to operate on the Bezier fan 600. The set of parameters include:

Domain: "tri"
Partitioning: "integer"
Output topology: "triangle_cw"
SV_TessFactor: {1, 1, contourTessellationFactor}
SV_InsideTessFactor: 1

The tri domain parameter specifies that the Bezier fan 600 will be treated as a deformed triangle. In an alternative embodiment, the Bezier fan 600 may be treated as a deformed rectangle. The integer partitioning parameter indicates that the interior of the deformed triangle will be partitioned using integer partitioning. For instance, using an interior point 620, the Bezier fan 600 has been partitioned into a curve segment 626, and two triangles 622 and 624 that each share an edge with the perimeter of the curve segment 626 (e.g., lines 628 and 630). The curve segment 626 extends from point 612 to point 618. In an alternative embodiment, fractional partitioning may be used to partition the interior of the deformed triangle. The output topology parameter specifies that the curve segment 626 will be approximated using a set of triangles, each of whose vertices will be specified in clockwise order.

The inside tessellation factor affects how many interior triangles are produced by the tessellation. An interior triangle is defined as a triangle that does not share an edge with the perimeter of the curve segment of the Bezier fan 600 (e.g., the lines 628 and 630). The inside tessellation factor is set to 1 which indicates that no interior triangles are produced by the tessellation. The contour tessellation factor is an integer that is chosen dynamically at runtime by utilizing a look-up table that is generated offline. The contour tessellation factor specifies how finely to subdivide the curve segment 626 using triangles that radiate out from the interior point 620 as shown in FIG. 6. In other words, the contour tessellation factor specifies the number of triangles to be used in the subdivision. In general, when a curve segment is tessellated too coarsely, the rendered image will have visible faceting. On the other hand, when a curve segment is tessellated too finely, the GPU becomes over-burdened and processing times become prolonged. The present invention utilizes the contour tessellation factor to strike a balance between tessellating too coarsely and tessellating too finely.

As mentioned, the contour tessellation factor is an integer that is chosen dynamically at runtime by utilizing a look-up table. The look-up table is generated offline (prior to compilation) by choosing a pre-defined set of contour tessellation factors (e.g., 2, 4, 8, 16, 32, and 64) and computing an associated bounding box dimension for each of the contour tessellation factors. Specifically, for each tessellation factor, n, the maximum value (henceforth called $D_n$) of $dist_{Chebychev}(B(t), L_n(t))$ is computed where:

$$dist_{Chebychev}(p,q) = \max(|p_x - q_x|, |p_y - q_y|); \text{ and}$$

B(t) is the canonical parameterization of a Bezier based on Bernstein basis functions (with t ranging from 0 to 1) for a cubic Bezier:

$$B(t) = t^3 * C_0 + 3(1-t)t^2 * C_1 + 3(1-t)^2 t * C_2 + (1-t)^3 * C_3$$

where $C_0, \ldots, C_3$ are the four Bezier control points whose x- and y-coordinates are each allowed to range in the interval [0, 1]. $L_n(t)$ is the normalized arc-length parameterization of the polyline segment connecting the points $$B(0), B\left(\frac{1}{n}\right), B\left(\frac{2}{n}\right), \ldots, B\left(\frac{n}{n}\right)$$

(with t ranging from 0 to 1), and t ranges in the interval [0,1]. This is a non-linear constrained optimization problem with 9 unknowns (the x- and y-coordinates of the control points and t) and 18 constraints (16 for the control points and two for t) and can be solved either analytically or numerically using well-known techniques. The invention includes an implementation-tunable constant, $\epsilon$, which is an upper bound on the maximum distance the Bezier tessellation can deviate from the true Bezier (the current invention chooses ¼). Finally, the values $$\left\{ \frac{\epsilon}{\sqrt{2} * D_2}, \frac{\epsilon}{\sqrt{2} * D_4}, \frac{\epsilon}{\sqrt{2} * D_8}, \frac{\epsilon}{\sqrt{2} * D_{16}}, \frac{\epsilon}{\sqrt{2} * D_{32}}, \frac{\epsilon}{\sqrt{2} * D_{64}} \right\}$$

are stored in a table that is accessible to the hull shader.

An exemplary look-up table is provided below

| Size of Bezier (maxDimensions) | Number of Subdivisions (contourTessellationFactor) |
| --- | --- |
| 0 ≤ x < 0.7 | 2 |
| 0.7 ≤ x < 2.3 | 4 |
| 2.3 ≤ x < 8.0 | 8 |
| 8.0 ≤ x < 30.0 | 16 |
| 30.0 ≤ x < 120.0 | 32 |
| 120.0 ≤ x < 485.0 | 64 |
| 485.0 ≤ x | Subdivided on the CPU |

Figure 7:
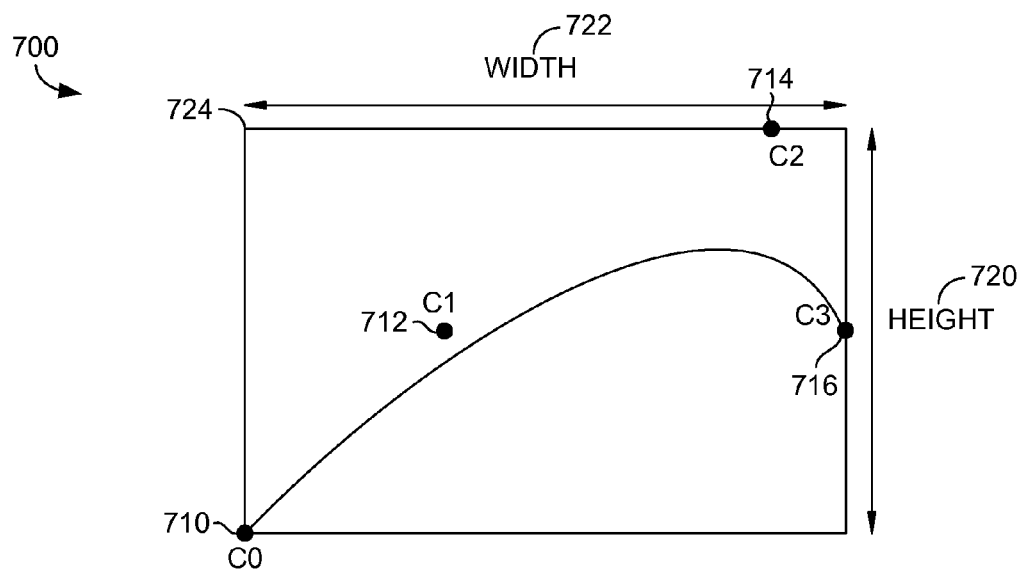
FIG. 7 is an illustration of a bounding box encompassing four control points of a Bezier fan in accordance with an embodiment of the present invention.

At runtime, a minimum bounding box that encompasses the four control points of the Bezier fan is computed. An exemplary bounding box 724 is shown in FIG. 7; it contains four control points of a Bezier fan as shown at points $C_0$ 710, $C_1$ 712, $C_2$ 714, and $C_3$ 716. The bounding box 724 has a height 720 and a width 722. The maximum dimension of the bounding box 724 is determined (e.g., either the height 720 or the width 722). The maximum dimension is matched to the appropriate range in the look-up table, and the minimum contour tessellation factor, n, is chosen such that $$maxDimension \leq \frac{\epsilon}{\sqrt{2} * D_n}.$$

If the maxDimension exceeds $$\frac{\epsilon}{\sqrt{2} * D_{64}},$$

the Bezier fan is tessellated into triangles on the CPU.

The domain shader receives as input from the hull shader the Bezier fan control points, $C_0, C_1, C_2, C_3$, the fan origin O, and a SV_DomainLocation (t, u, v). The domain location is specified in Barycentric coordinates, meaning that 0≤t, u, v≤1 and t+u+v=1, which allows u to be ignored. The domain shader emits as output a vertex position P for each of the triangles along the curve segment (e.g., the curve segment 626 of FIG. 6). Each vertex position P is calculated using the following formula:

$$P(t,v) = B(t) * v + O * (1-v)$$

where B(t) is the Bernstein polynomial:

$$B(t) = t^3 * C_0 + 3(1-t)t^2 * C_1 + 3(1-t)^2 t * C_2 + (1-t)^3 * C_3$$

Figure 8:
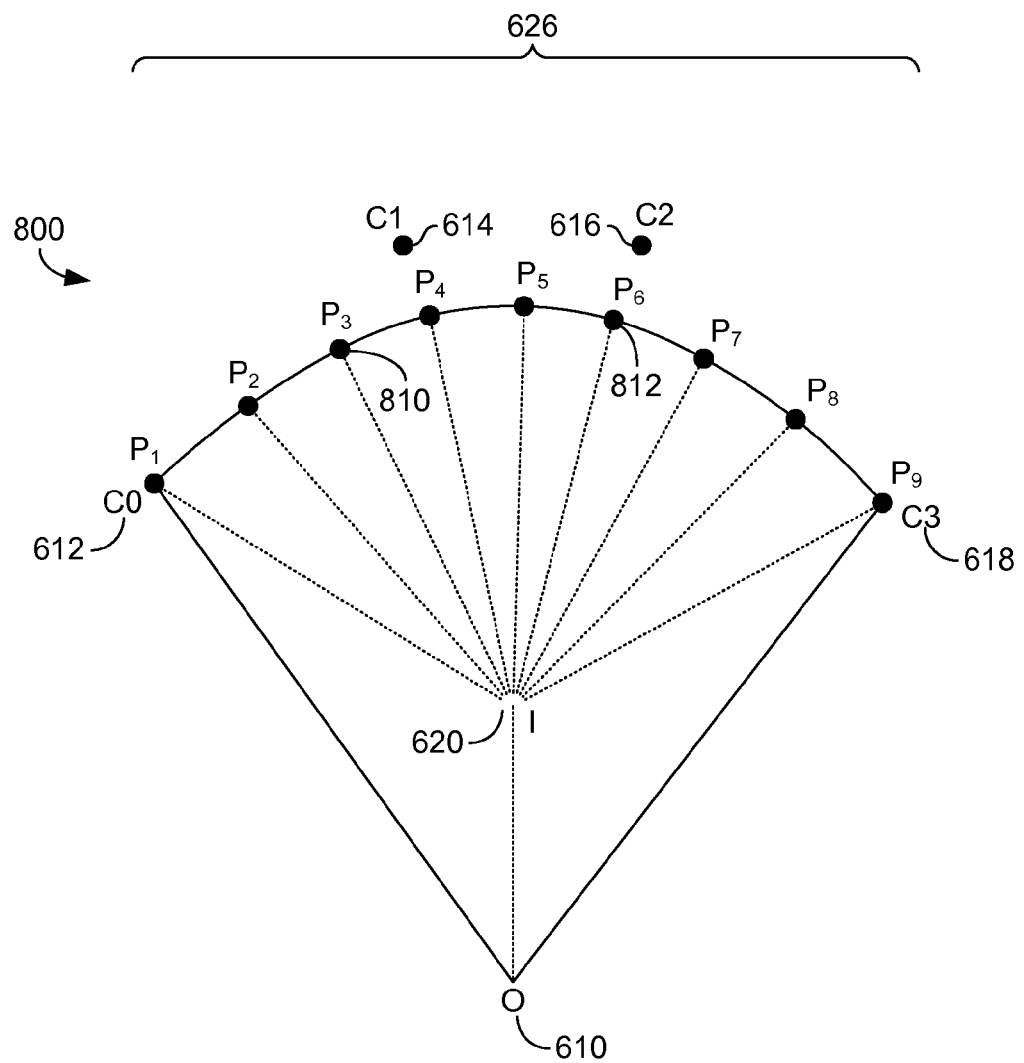
FIG. 8 is an illustration of an intermediate tessellation that has been tessellated in a graphics pipeline running on a graphics processing unit in accordance with an embodiment of the present invention.

The output of the domain shader is depicted in FIG. 8. FIG. 8 illustrates the same Bezier fan as shown in FIG. 6 (now labeled as Bezier fan 800). Each of the triangles meets the curve segment 626 at a vertex position P (e.g., vertex positions $P_1, \ldots, P_9$). Two exemplary vertex positions are shown at numerals 810 and 812.

Figure 9:
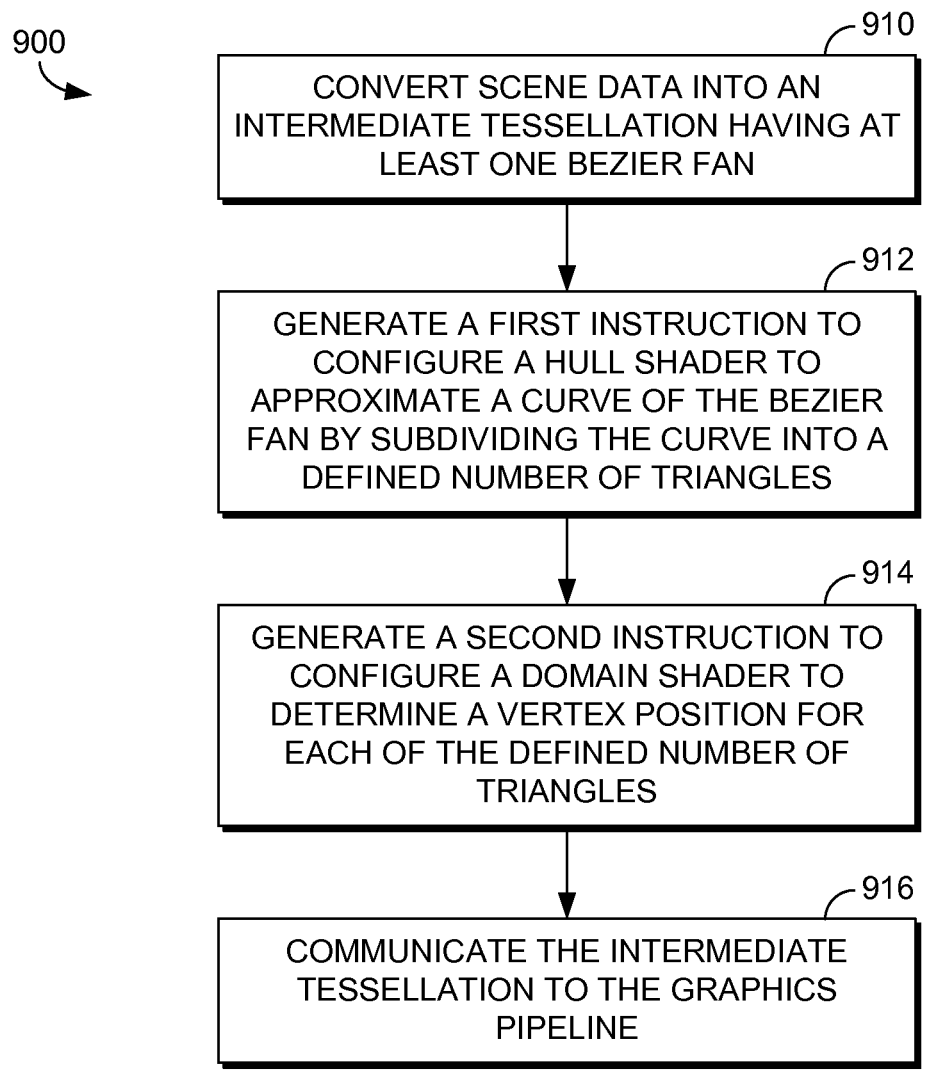
FIG. 9 is a flow diagram of an exemplary method of rendering antialiased two-dimensional curves in accordance with an embodiment of the present invention.

Turning now to FIG. 9, a flow diagram is depicted of an exemplary method of rendering antialiased 2-D curves and is referenced generally by the numeral 900. Antialiased graphics are rendered images with lines and/or curves that appear straight or smooth, rather than stair-stepped. The antialiased rendered images are produced by an anti-aliasing process that utilizes components of a graphics pipeline such as the graphics pipeline 300 of FIG. 3. Rendering is a process of generating a rasterized bitmap representation of scene data. A rendered image does not actually have to be displayed for the completion of the rendering process. The method 900 may be performed by an image component. Examples of image components include word processing applications, spreadsheet applications, presentation applications, personal contact applications, games, and other applications that produce two-dimensional images.

At a step 910, scene data is converted into an intermediate tessellation by generating a set of geometric shapes tessellated from objects in the scene data. The intermediate tessellation includes at least one Bezier fan defined by a fan origin and four control points. Other exemplary geometric shapes may include triangles and arc segments. In one embodiment, the converting step is done by software running on a CPU.

At a step 912, a first instruction to configure a hull shader in the graphics pipeline is generated. The hull shader is configured to approximate a curve or curve segment of the Bezier fan by subdividing the curve into a defined number of triangles based on a maximum value of a width or a height of a minimum bounding box that contains the four control points that define the Bezier fan. As explained above, the number of triangles used to approximate the curve is determined based on a pre-computed look-up table comprising one or more ranges of maximum height or width values and corresponding subdivision factors or contour tessellation factors. The first instruction may be communicated to an API that, in turn, configures the hull shader on the GPU.

At a step 914, a second instruction to configure a domain shader in the graphics pipeline is generated. The domain shader is configured to determine a vertex position for each of the defined number of triangles along the curve at the Bezier fan using, for example, a Bernstein polynomial. The second instruction may also be communicated to an API that, in turn, configures the domain shader on the GPU. At a step 916, the intermediate tessellation is communicated from the CPU to the graphics pipeline running on the GPU.

The method 900 may further include generating a third instruction to define a render-target storage value in the graphics pipeline. The render-target storage value defines the amount of memory allocated to the rendered image. The rendered image may be the end result of running the intermediate tessellation through the graphics pipeline. The third instruction may be communicated to an API that in turn configures a process on the GPU.

A fourth instruction may also be generated to define a sampling rate for a rasterizer in the graphics pipeline. The sampling rate is defined independently from the render-target storage. Because these items are defined separately, their values do not need to be tied together. In one embodiment, the memory, or render-target storage value is set to 1× the rendered bitmap representation. For example, if the rendered image was 480 pixels×480 pixels, the allocated memory could be enough to store 230,400 pixels. Since the sampling rate is defined independently, the sampling rate could be four sub-pixels per pixel even with the memory allocation for 230,400 pixels on a 480×480 rendered bitmap representation. The fourth instruction may be communicated to an API that in turn configures a process on the GPU.

Additional instructions may also be generated. For instance, instructions may be generated to configure a pixel shader in the graphics pipeline to process the intermediate tessellation. The instruction may vary depending on whether the geometric shapes within the intermediate tessellation overlap or are non-overlapping. In a scenario where the geometric shapes are non-overlapping, the pixel shader is configured to count the number of bits set in the intermediate tessellation, normalize the results to a real number, and add the real number to current contents of a render target. On the other hand, when there is overlap between the geometric shapes, the pixel shader is configured to combine the triangle or triangles emitted by the domain shader with current contents of a render target using a logical process to determine which color is added or subtracted from the render target. In one embodiment, the logical process is a bitmap exclusive-or (XOR) operation. In another embodiment, the logical process is a bitmap OR operation.

Figure 10:
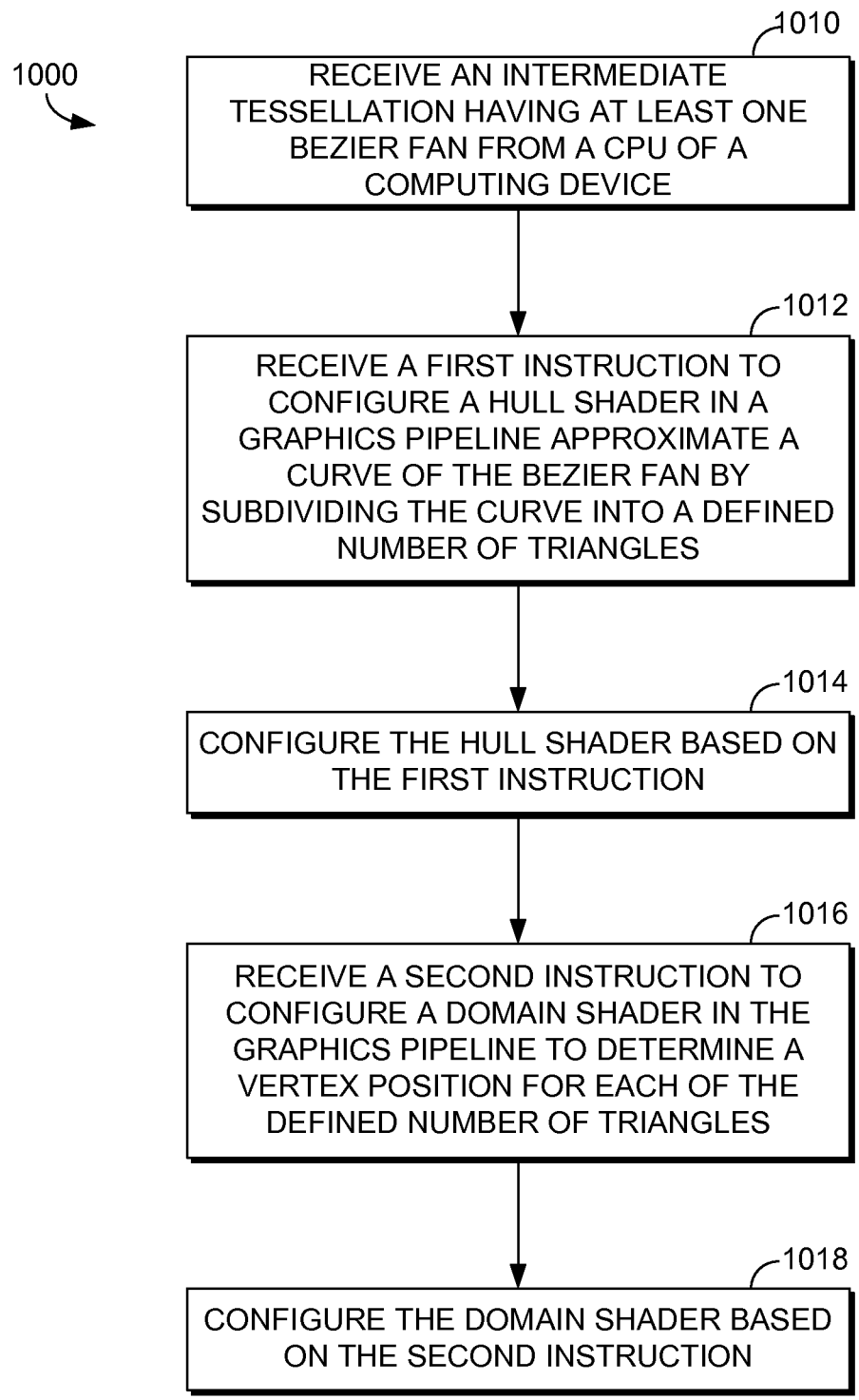
FIG. 10 is a flow diagram of an exemplary method of instructing a graphics processing unit to tessellate a two-dimensional curve in accordance with an embodiment of the present invention.

Turning now to FIG. 10, a flow diagram is depicted of a method 1000 of instructing a GPU to rasterize an intermediate tessellation of an object. The intermediate tessellation comprises at least a Bezier fan having four control points and a fan origin. The method 1000 may be performed by an API.

At a step 1010, the GPU receives the intermediate tessellation from a CPU of a computing device. The intermediate tessellation comprises a high-level representation of the object having one or more line segments and at least one Bezier fan defined by a fan origin and four control points. At a step 1012, the GPU receives a first instruction to configure a hull shader in a graphics pipeline running on the GPU to, among other things, approximate a curve of the Bezier fan by subdividing the curve into a defined number of triangles.

The first instruction may also comprise a tri domain instruction specifying the hull shader to treat the Bezier fan as a deformed triangle having two sides and a curved side. The first instruction may also comprise a partition instruction for partitioning the interior of the Bezier fan, and an output topology instruction specifying that the curve of the Bezier fan will be subdivided using a set of triangles, each of whose vertices will be specified in clockwise order. The first instruction additionally comprises an inside tessellation factor instruction of 1 that guarantees that there are no interior triangles (e.g., triangles that do not share an edge with the perimeter of the curve segment of the Bezier fan).

At a step 1014, the hull shader is configured by the computing device based on the first instruction. At a step 1016, the GPU receives a second instruction for configuring a domain shader in the graphics pipeline to determine a vertex position for each of the defined number of triangles along the curve of the Bezier fan. At a step 1018, the domain shader is configured based on the second instruction.

The method 1000 further comprises the hull shader executing the first instruction against the Bezier fan of the intermediate tessellation. The hull shader computes a minimum bounding box containing the Bezier fan's four control points and determines a maximum value of either the width or the height of the bounding box. A look-up table comprising ranges of maximum height or width values and corresponding contour tessellation factors is accessed, and the maximum value of the bounding box is matched to one of the ranges in the look-up table. A subdivision factor or contour tessellation factor corresponding to the matched range is determined from the look-up table, and this factor is used to subdivide the Bezier fan curve into a number of triangles equal to the contour tessellation factor. The method 1000 additionally comprises the domain shader executing the second instruction against the Bezier fan in order to determine the vertex position for each of the defined number of triangles along the Bezier fan curve.

Additional instructions may be received by the GPU. For instance, an instruction to define a render-target storage value in the graphics pipeline running on the GPU is received. The instruction may be received from a program. An amount of memory in the GPU corresponding to the render-target storage value is allocated. The memory may be allocated by a driver for the GPU. Instructions may also be received to define a sampling rate for a rasterizer in the graphics pipeline on the GPU. The sampling rate is defined independently from the render-target storage value. The rasterizer is configured to sample scene data at the sampling rate. The rasterizer may be configured through drivers in the GPU. The sampling rate and storage value may be independent of each other. In one aspect, the sampling rate may be greater than the render-target storage value where the render-target storage value is equivalent to one pixel per pixel in a rendered image, and the sampling rate is set to four sub-pixels per pixel.

Embodiments of the invention have been described to be illustrative rather than restrictive. It will be understood that certain features and subcombinations are of utility and may be employed without reference to other features and subcombinations. This is contemplated by and is within the scope of the claims.

What is claimed is:

1. One or more computer-storage media having computer-executable instructions embodied thereon that, when executed, perform a method of rendering antialiased two-dimensional curves, the method comprising:
   converting scene data into an intermediate tessellation by generating a set of geometric shapes tessellated from objects in the scene data, the set of geometric shapes comprising at least one Bezier fan having four control points and a fan origin;
   generating a first instruction to configure a hull shader in a graphics pipeline to approximate a curve of the at least one Bezier fan by subdividing the curve into a defined number of triangles based on a maximum value of one of a width or a height of a minimum bounding box containing the four control points of the at least one Bezier fan, the defined number of triangles being determined based on a look-up table comprising the maximum value of the one of the width or the height and corresponding subdivision factors;
   generating a second instruction to configure a domain shader in the graphics pipeline to determine a vertex position for each of the defined number of triangles along the curve of the at least one Bezier fan; and
   communicating the intermediate tessellation to the graphics pipeline.

2. The media of claim 1, further comprising:
   generating a third instruction to define a render-target storage value in the graphics pipeline; and
   generating a fourth instruction to define a sampling rate for a rasterizer in the graphics pipeline, the sampling rate being defined independently from the render-target storage value.

3. The media of claim 2, further comprising receiving rendered scene data from the graphics pipeline.

4. The media of claim 2, further comprising communicating the first instruction, the second instruction, the third instruction, and the fourth instruction to an application programming interface that configures functions in a graphics processing unit.

5. The media of claim 2, wherein the vertex position for each of the defined number of triangles is determined, in part, using a Bernstein polynomial.

6. The media of claim 1, wherein the look-up table is precomputed.

7. The media of claim 1, wherein the method further comprises, when the maximum value of the one of the width or the height of the minimum bounding box exceeds a threshold value, tessellating the at least one Bezier fan into triangles on a central processing unit (CPU).

8. A method of rasterizing an intermediate tessellation of an object in a graphics pipeline running on a graphics processing unit (GPU), the intermediate tessellation comprising at least one Bezier fan having four control points and a fan origin, the method comprising:
   receiving the intermediate tessellation from a central processing unit (CPU) of a computing device;
   receiving a first instruction to configure a hull shader in the graphics pipeline to approximate a curve of the at least one Bezier fan by subdividing the curve into a defined number of triangles based on a maximum value of one of a width or a height of a minimum bounding box containing the four control points of the at least one Bezier fan;
   configuring, through the computing device, the hull shader based on the first instruction;
   receiving a second instruction for configuring a domain shader in the graphics pipeline to determine a vertex position for each of the defined number of triangles along the curve of the at least one Bezier fan; and
   configuring, through the computing device, the domain shader based on the second instruction.

9. The method of claim 8, wherein the intermediate tessellation comprises a high-level representation of the object comprising one or more line segments and one or more Bezier curve segments.

10. The method of claim 8, further comprising:
    the hull shader executing the first instruction against the at least one Bezier fan; and
    the domain shader executing the second instruction against the at least one Bezier fan.

11. The method of claim 10, wherein the hull shader executing the first instruction against the at least one Bezier fan comprises in part:
    computing the minimum bounding box containing the four control points of the at least one Bezier fan;
    determining the maximum value of one of the height or the width of the minimum bounding box;
    accessing a look-up table comprising one or more ranges of maximum height or width values and corresponding subdivision factors;
    matching the maximum value of the at least one of the height or the width of the minimum bounding box with at least one of the one or more ranges in the look-up table;
    determining a subdivision factor corresponding to the matched range; and
    subdividing the at least one Bezier fan curve into a number of triangles equal to the subdivision factor.

12. The method of claim 8, further comprising:
    receiving a third instruction to define a render-target storage value in the graphics pipeline;
    allocating, through the computing device, an amount of memory in the GPU corresponding to the render-target storage value;
    receiving a fourth instruction to define a sampling rate for a rasterizer in the graphics pipeline, wherein the sampling rate is defined independently from the render-target storage value; and
    configuring, through the computing device, the rasterizer to sample scene data at the sampling rate.

13. The method of claim 12, wherein the sampling rate is greater than the render-target storage value.

14. The method of claim 12, wherein the render-target storage value is equivalent to one pixel per pixel in a rendered image and the sampling rate is set to four sub-pixels per pixel.

15. The method of claim 8, wherein the first instruction further comprises:
    (A) a tri domain instruction specifying the hull shader to treat the at least one Bezier fan as a deformed triangle having two sides and the curve side,
    (B) a partition instruction for partitioning the interior of the at least one Bezier fan, (C) an output topology instruction specifying that the curve side of the at least one Bezier fan will be subdivided into a set of triangles, and (D) an inside tessellation factor instruction specifying that the partitioning of the at least one Bezier fan will not result in any interior triangles, an interior triangle comprising a triangle that does not share an edge with a perimeter of the curve of the at least one Bezier fan.

16. The method of claim 15, wherein the partitioning instruction comprises at least one of an integer partitioning instruction or a fractional partitioning instruction.

17. A system comprising:
one or more processors;
a graphics processing unit (GPU); and
an application program interface (API) module for controlling the graphics processing unit (GPU), the API module comprising:
  a subdivision-factor property that defines parameters used by a hull shader component to approximate a curve of at least one Bezier fan by subdividing the curve into a defined number of triangles based on a maximum value of one of a width or a height of a minimum bounding box containing four control points that define the Bezier fan; and
  a position-factor property that defines parameters used by a domain shader component to determine a vertex position for each of the defined number of triangles along the curve of the at least one Bezier fan.

18. The system of claim 17, wherein the API further comprises:
a render-target storage property that defines an amount of memory allocated on the GPU to a rendered image; and
a sampling-rate property that defines a sampling rate used by a rasterizer component.

19. The system of claim 18, wherein the API is used to configure the GPU for rendering a two-dimensional image having a two-dimensional curve.

20. The system of claim 18, wherein the hull shader component, the domain shader component, and the rasterizer component run on the GPU.

* * * * *